United States Patent [19]

Ruegg

[11] 3,736,087
[45] May 29, 1973

[54] MOLD CLOSING UNIT WITH SEPARATELY ACTING ROTARY AND FLUID PRESSURE PISTON DRIVES

[75] Inventor: Edwin Rüegg, Netstal, Switzerland

[73] Assignee: Maschinenfabrik Giesserei Netstal AG, Netstal, Switzerland

[22] Filed: Dec. 17, 1970

[21] Appl. No.: 99,051

[52] U.S. Cl. .................425/137, 425/154, 425/450, 425/167
[51] Int. Cl. .................................................B29f 1/00
[58] Field of Search......................18/30 LM, 30 LA, 18/30 LC, 30 LT, 30 LV, 30 CS, 30 CM, 16 T, 16 C, 30 LB, 30 LD, 30 LE, 30 LF; 425/137, 150, 154, 167, 450

[56] References Cited

UNITED STATES PATENTS

| | | | |
|---|---|---|---|
| 3,507,012 | 4/1970 | Aoki | 18/30 LC |
| 3,564,657 | 2/1971 | Aoki | 18/30 CS |
| 3,452,399 | 7/1969 | Blumer | 18/16 C |
| 2,711,567 | 6/1955 | Knapp | 18/30 LT |
| 2,917,773 | 12/1959 | Burke | 18/30 LT |
| 3,418,692 | 12/1968 | Valyi | 18/30 LV |
| 3,247,545 | 4/1966 | Sullivan | 425/450 X |
| 3,310,842 | 3/1967 | Fischbach | 425/450 |
| 3,423,502 | 1/1969 | Stimpson | 425/150 X |

Primary Examiner—J. Spencer Overholser
Assistant Examiner—David S. Safran
Attorney—John J. McGlew and Alfred E. Page

[57] ABSTRACT

A mold plate closing mechanism includes a housing member which is connected to a movable mold plate which is guided for movement toward and away from a fixed mold plate along with the housing member. The housing member is shifted by a rotary drive and also by a fluid pressure-operated piston which is connected to the housing member. The arrangement includes an electrical contact switch for shifting from one drive to the other.

6 Claims, 1 Drawing Figure

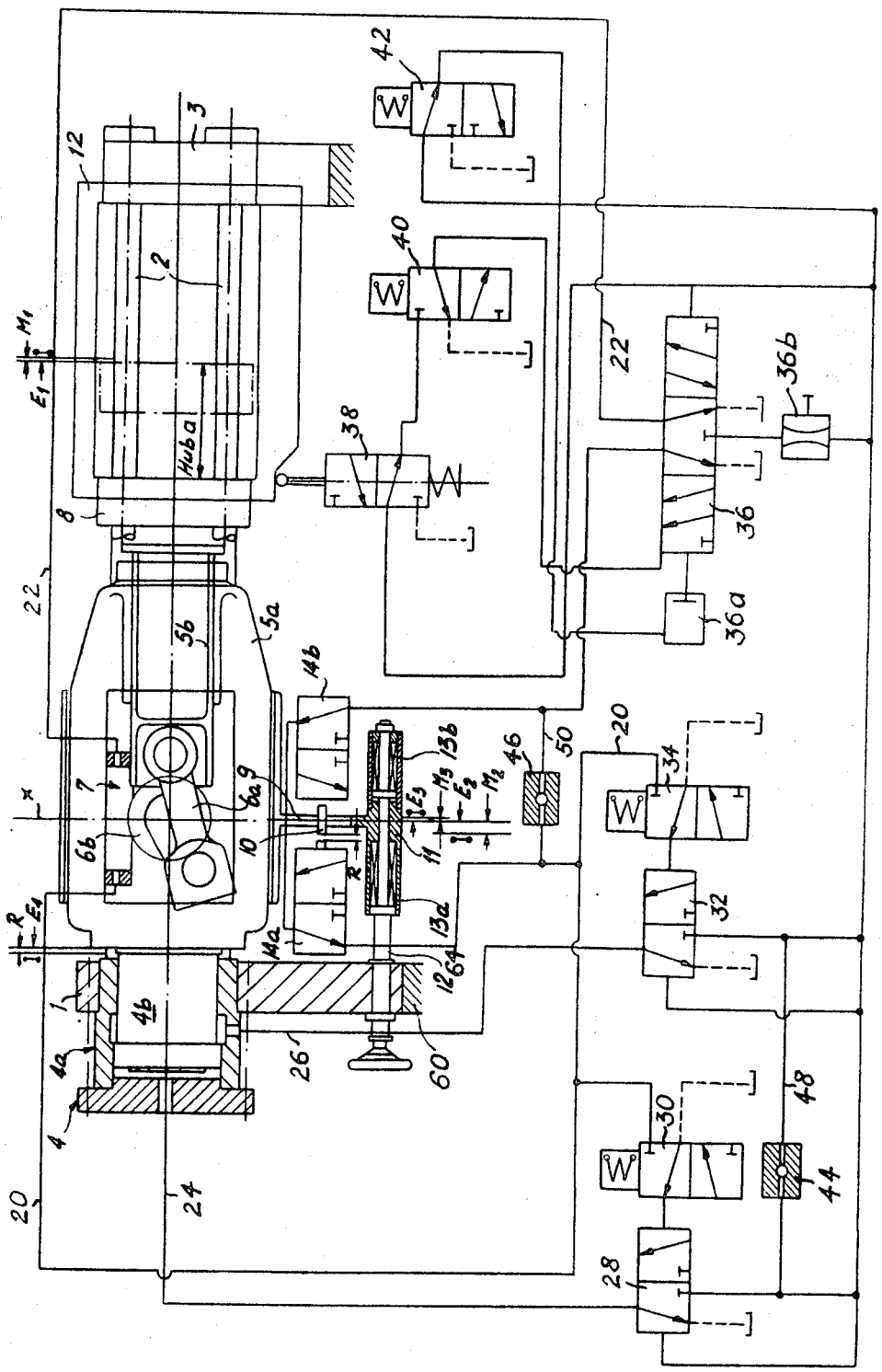

MOLD CLOSING UNIT WITH SEPARATELY ACTING ROTARY AND FLUID PRESSURE PISTON DRIVES

This invention relates in general to the construction of molds, and in particular, to a new and useful device for closing and opening a mold plate having two separate driving means with a switching arrangement for switching from one drive to the other.

The present invention is particularly applicable to mold closing units for injection molding machines for processing duroplasts, thermoplasts or elastomers. The known mold-closing units have a toggle lever mechanism for the production of the closing forces. A disadvantage in the operation of such closing units is that the lever mechanisms require lubrication of the articulated parts and the lubrication becomes scattered about the operating parts and the machine bed becomes dirtied due to the unavoidable formation of dust caused by the use of compressed air in the injection molding unit. The construction of the toggle lever mechanisms permits no satisfactory collection of the lubricating oil due to the different movements of the parts. The toggle lever mechanisms are therefore subject to great wear without regular attendance which would require laborious cleaning operations. This wear is further increased by the penetration of plastic dust with the lubricating oil into the bearings.

In accordance with the present invention, there is provided a closing system for a mold which operates without any of the lubricant collection and fouling problems and also operates with minimal care. The closing unit of the invention includes separate driving mechanisms for the production of the closing or opening movement and for the projection or elimination of the closing force. The mechanisms for closing and opening the mold plate comprises a rotary drive which includes a small piston as an operating element which is guided in a housing wall and the mechanism for applying the closing force or relieving this closing force comprises a fluid pressure-operated piston which is rigidly connected with the housing and is coaxial to the axis thereof. The fluid pressure control piston produces the closing force on the housing directly. The design of the two types of drives with a movable piston element for each provides a compact construction and also provides means for enclosing the mechanical movement mechanism for effecting the relatively large closing and opening stroke so that the fouling of the operating parts which was due to exposed parts which require lubrication, is eliminated. The arrangement includes a switching mechanism for switching automatically from one drive to the other in dependence on the position, for example, of the housing or the movable plate.

Accordingly, it is an object of the invention to provide an improved device for opening and closing a mold which includes a housing member which accommodates a first drive, for example, a rotary drive, for effecting the opening and closing of the plate and which is connected to a second drive, for example, a fluid piston operated drive, for effecting the force holding engagement of the plate.

A further object of the invention is to provide a mold-closing mechanism which includes two separate drives for effecting the opening and closing movement and the holding movement of a mold, respectively, and which includes switching means for switching from one drive to the other.

A further object of the invention is to provide a mold-closing mechanism which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

The only FIGURE of the drawing is a schematic sectional and partial elevational view of a mold-closing mechanism constructed in accordance with the invention.

Referring to the drawing in particular, the invention embodied therein comprises, a supporting yoke 60 for a mounting wall 1 of an injection molding machine. The wall 1 provides a support for a housing 5a and a guide frame 12 having guide rods 2 which form tie rods and which extend to a fixed mold plate or stationary mold part 3.

In accordance with the invention, a cylinder 4a is secured to the support yoke 1 and a differential piston 4b is slidable therein and is connected to the housing 5a for transmitting a pressure-closing force through the housing 5a to a movable plate or mold part 8. The mold part 8 is moved to engage with the fixed plate 3. The piston 4b is secured directly to one end face of the housing 5a. The other end face of the housing 5a is provided with a wall opening which serves as a guide for a crosshead piston 5b which is arranged coaxially to the piston 4b and is connected to the mold part 8. The piston 5b is driven by second drive means and it is connected by a connecting rod 6a to a crankshaft 6b which is driven from a rotary piston drive, generally designated 7, which is carried on the housing. The rotary piston drive 7 is actuated by fluid pressure admitted to a housing 5a and the rotary output shaft 6b is infinitely variable in its angle of rotation between predetermined values. The driving elements 5a, 6a and 6b associated with the crosshead piston 5b form the second drive for the production of the closing and opening movement of the mold clamping plate 8 which is secured on the free end of the crosshead piston 5b and is guided on the tie rods 2.

In accordance with the invention, switching means are associated with the housing for controlling the drive means for the movement of the plate 8 in order to provide an automatic shifting from the second drive means which is actuated by the rotary piston drive 7 to the first drive means which is actuated by the fluid piston 4b. This means includes an arm 9 which is carried on the housing 5a and extends laterally therefrom and terminates in a stop cam 10 which is active in both axial directions. The arm 9 also is provided with a cylinder member or eye member 11 whose bore extends parallel to the axis of the piston 4b and is traversed by a spindle 64. The spindle 64 is axially displaceable in the support wall 1 by means of a thread connection thereto. The spindle 64 is biased on each side by springs 13a and 13b acting on stops and referred to as Schnorr' springs. *The force of spring 13 a is greater than that of 13b.* The two springs 13a and 13b hold the arm 9 and thus the housing 5a when the piston 4b is relieved in a rest position indicated at the plane designation "X". This rest position X and the height of the mold can be infinitely varied within the limits, for example, (selected limits 1 to 10 mm) as determined by the correspondingly infinitely variable stroke of the differential piston 4b.

In accordance with another feature of the invention, associated with the closing mechanism is an electro-hydraulic switching and safety mechanism which is schematically shown. The electrical circuit contains a first reversing switch E1 which is actuated by a stop of the moving mold clamping plate 8. A second reversing switch E4 is actuated by a stop of the housing 5a, as are two circuit breakers E2 and E3 which are arranged in the path of motion of the arm 9. The hydraulic control circuit of the device contains locking valves 14a and 14b which are also arranged in the path of motion of the arm 9 and which are actuated by a double cam 10. These locking valves 14a and 14b can release or block the pressure oil supply to the cylinder 4a and also to the rotary piston drive 7.

The method of operation of the device is as follows: The normal position of the device is indicated in the drawing by solid lines. Both the crosshead piston 5b and the hydraulic piston 4b are in their open position corresponding to the open position of the mold. The arm 9 assumes under the action of the springs 13a and 13b the neutral position indicated by the plane X. During the following closing of the injection mold which is effected by the relative closing movement of the die-plates 3 and 8, the crosshead piston 5b and thus the moving dieplate 8, are moved to the right by means of the rotary piston drive 7 by a stroke a in accordance with the setting of the rotary piston drive 7. In this position of the dieplate 8, indicated in the drawing by dash lines, the mold is still opened by a predetermined gap measure M1. In practice, this gap measures about 0.1 to 0.2 mm. When the gap measure M1 has been reached, the electrical contact E1 is actuated so that the mold is closed by the gap measure M1 by the action of the fluid pressure-control piston 4b which produces the necessary closing force on the plate 8. The stroke of the piston 4b is relatively small, that is, it is composed of the gap measure M1 and of the expansion measure of the machine parts enclosed in the closing force range. Since the piston 4b is rigidly connected with the housing 5a, the stroke of piston 4b is also transmitted to the arm 9 to compress the spring 13b. When the piston 4b is relieved after the injecting molding, this spring 13b returns arm 9 and thus housing 5a and piston 4b automatically to the neutral position X. The opening of the mold is thus effected first by hydraulic piston 4b whose opening stroke R is infinitely variable. In practice, the adjustment range of the opening stroke R is between about 1 and 10 mm. The mold opening force can thus be kept within reasonable limits and does not depend, for example, on toggle lever characteristics. From this mold opening stroke R of piston 4b, and thus of the housing 5a, the arm 9 compresses spring 13a and a switch E4 is actuated at the end of the opening stroke R to effect disconnection of the hydraulic opening movement by the piston 4b and the connection of the crank drives 6a, 6b and 5b for the remainder of the opening movement. The crosshead piston 5b and the moving dieplate 8 and the piston 4b with the housing 5a return to the neutral position X under relaxation of the spring 13a and then the next cycle can begin.

The closing of the mold plate 8 is so controlled, that if a foreign body, which is greater in thickness than the dimension M1, is located between the mold plates 8 and 3, there will be no closing force produced. Such a foreign body has the effect that the closing movement produced by the second drive, that is the crank drive 7, cannot move through the gap M1 and therefore the contact E1 is not actuated and the supply of pressure oil to the piston 4b does not take place. Since the force transmitted by the crank drive 7 to the crosshead piston 5b is still active, the housing 5a is forced to the left, as indicated in the drawing, and this has the result that the spring 13a is compressed by the arm 9. The cam 10, after passing through the stroke R, strikes against the locking valve 14a so that it becomes reversed and actuates contact E2 to discontinue the supply of pressure oil both to the rotary piston drive 7 and to the piston 4 to cause the crank drive 7 to stop.

As shown in the drawing, the switching movement to the dimension M2 is composed of the opening stroke R of the piston 4b and the switching path of the locking valve 14a. After the supply of pressure oil is stopped, the housing 5a returns under the action of the spring 13a to its neutralposition X. The mold or the driving elements could be damaged if too great a gap measure M1 is selected. If the gap is selected too great, the housing 5a will yield to the right, as indicated in the drawing, and compress the spring 13b with the cam 10 of the arm 9 causing the reversal of the locking valve 14b so that the supply of pressure oil to the rotary piston drive 7 and to the piston 4b is discontinued and the crank drive 7 comes to a halt. The housing 5a would then snap back into the neutral position X under the action of the spring 13b. The switching which is effected with movement through the path M3 is identical with the switching path of the locking valve 14b.

The mold-closing unit of the invention has a compact design and operates substantially trouble-free. It is safe in respect to overload both in respect to foreign bodies which move between the mold elements and also in respect to any false setting of the gap clearance.

The electrical contact means broadly referred to herein includes all of the switching elements and the operating fluid controls affecting the charging of the rotary piston 7 and the fluid pressure cylinder 4a. As shown in the drawing, this includes the main connecting lines 20 and 22, for the rotary piston drive 7, and 24 and 26, for the fluid pressure cylinder 4a, together with associated valves 28, 30, 32, 34, 36, 36a, 36b, 38, 40, 42. The system also includes crossover control elements 44 and 46 in lines 48 and 50, respectively.

While a specific embodiment of the invention has been shown and described in detail to illustrate the application of the principles of the invention, it will be understood that the invention may be embodied otherwise without departing from such principles.

The embodiment of the invention in which as exclusive property or privilege is claimed is defined as follows:

1. A mold closing unit for injection molding machines for plastics for processing duroplasts, thermoplasts and elastomers and which includes separate driving mechanism for the production of closing and opening movements and also for applying and eliminating a closing force to the mold, comprising a movable mold member movable in closing and opening directions for opening and closing the mold and being forced into a closing direction to apply a closing force to the mold comprising a housing connected to the movable part of the mold, a mechanical movement mechanism for moving the housing with the movable part of the mold in opening and closing direction including an operating piston guided within the housing and connected to the movable mold member, and a fluid pressure operated piston arranged coaxially with said operating piston and connected to said housing for shifting said housing for the production of the closing force and in a reverse direction for the elimination of the closing force, an electrical contact means connected to said operating piston and said fluid pressure piston, spring means biasing said housing to a neutral position after said fluid pressure piston is unloaded after the closing or opening movement, the stroke of said fluid pressure piston being equal to the sum of the clearance gap permitted between the movable mold member and the fixed mold member, the clearance gap being set for operating said electrical contact means for switching from the operating piston to said fluid pressure piston to effect the production of the closing force after the predetermined clearance gap is exceeded.

2. A mold closing unit for injection molding machines for plastics for processing duroplasts, thermoplasts and elastomers and which includes separate driving mechanism for the production of closing and opening movements and also for applying and eliminating a closing force to the mold, comprising a movable mold member movable in closing and opening directions for opening and closing the mold and being forced into a closing direction to apply a closing force to the mold comprising a housing connected to the movable part of the mold, a mechanical movement mechanism for moving the housing with the movable part of the mold in opening and closing direction including an operating piston guided within the housing and connected to the movable mold member, and a fluid pressure operated piston arranged coaxially with said operating piston and connected to said housing for shifting said housing for the production of the closing force and in a reverse direction for the elimination of the closing force, said mechanical drive comprising a crank drive, and a rotary piston connected to said crank drive to rotate said crank drive.

3. A mold plate closing unit, according to claim 2, wherein said rotary piston has an infinitely variable angle of rotation.

4. A mold closing unit, according to claim 1, wherein said electrical contact means includes first and second locking valves, and means carried by said housing for actuating said valves during movement thereof, said locking valve being actuated by said biasing means when the gap measure is set too high and the other locking valve being operated by said biasing means in the presence of a foreign body between the mold closing parts to disconnect said operating piston and said fluid pressure piston.

5. A mold plate closing unit, according to claim 4, including a first biasing spring biasing said housing in a direction toward the closing of the mold and a second biasing spring which is stronger than said first spring biasing said housing in a direction away from the closing of the mold.

6. A mold plate closing unit, according to claim 5, wherein said second spring is dimensioned so that damage to said mold by a foreign body between the mold halves is prevented.

* * * * *

UNITED STATES PATENT OFFICE
CERTIFICATE OF CORRECTION

Patent No. 3,736,087            Dated May 29, 1973

Inventor(s) Edwin Rüegg

It is certified that error appears in the above-identified patent and that said Letters Patent are hereby corrected as shown below:

In the heading of the patent, please insert the following:

[30] FOREIGN APPLICATION PRIORITY DATA:

December 23, 1969      Switzerland...... 19190

Signed and sealed this 15th day of July 1975.

(SEAL)
Attest:

RUTH C. MASON
Attesting Officer

C. MARSHALL DANN
Commissioner of Patents
and Trademarks